Figure 1:
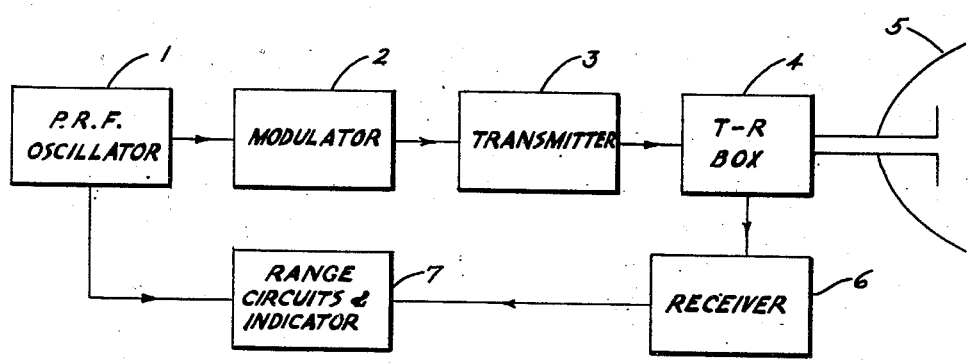

April 11, 1950     W. P. BOOTHROYD     2,503,320
TIME INTERVAL INDICATING SYSTEM
Filed April 10, 1946

INVENTOR.
WILSON P. BOOTHROYD
BY
AGENT

April 11, 1950  W. P. BOOTHROYD  2,503,320
TIME INTERVAL INDICATING SYSTEM
Filed April 10, 1946  6 Sheets-Sheet 5

INVENTOR.
WILSON P. BOOTHROYD
BY
AGENT

April 11, 1950 W. P. BOOTHROYD 2,503,320
TIME INTERVAL INDICATING SYSTEM
Filed April 10, 1946 6 Sheets-Sheet 6
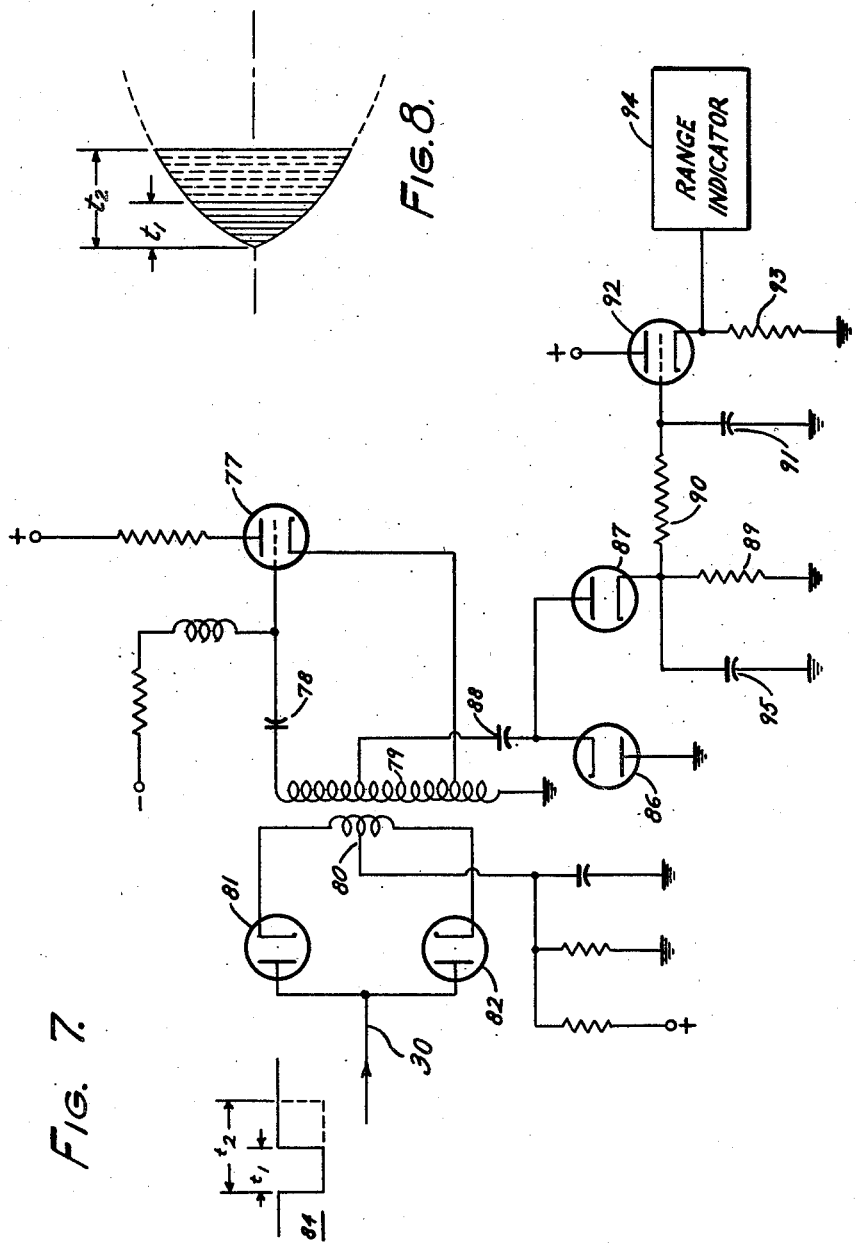
INVENTOR.
WILSON P. BOOTHROYD
BY
AGENT Patented Apr. 11, 1950

2,503,320

UNITED STATES PATENT OFFICE 2,503,320

TIME INTERVAL INDICATING SYSTEM

Wilson P. Boothroyd, Philadelphia, Pa., assignor, by mesne assignments, to Philco Corporation, Philadelphia, Pa., a corporation of Pennsylvania Application April 10, 1946, Serial No. 660,905

1 Claim. (Cl. 175—381)

This invention relates to improved range circuits for use in radar systems to generate an output signal comprising a unidirectional potential which is a function of the range from the radar equipment to a target. Such an output signal may be supplied to a suitable indicator adapted to give a direct visual or otherwise sensible indication of the target range or may be supplied to a computer or other device requiring range information for its operation. Although the range circuits hereinafter to be described and claimed are not limited to use with any particular radar system, they are especially adapted for use in a system such as that described in copending application of William E. Bradley, Serial Number 651,398, filed March 1, 1946. One embodiment of the present invention is in fact described in the Bradley application.

The range circuits hereinafter to be described are adapted to be actuated initially by pulse signals derived from the transmitter of a radar system and subsequently by the reflections from target objects of the transmitted pulses arriving at the receiver of the radar system, or by other pulses timed with reference to such received pulses.

One object of the invention is to provide radar range circuits of improved accuracy and adapted to yield an output signal comprising a unidirectional potential, the magnitude of which is essentially a linear function of range.

Another object of the invention is to provide radar range circuits adapted to respond only to received reflected signals from targets located within predetermined minimum and maximum range limits.

Still another object of the invention is to provide radar range circuits which, in the absence of any target within the specified range limits, will yield an output signal corresponding to that for a target at maximum range whereby it can readily be determined whether or not the range circuits are operating properly and whereby they may be readily and conveniently calibrated without the utilization of any special equipment.

A further object of the invention is to provide radar range circuits particularly adapted for use in a radar system employing a superregenerative receiver, and wherein the superregenerative receiver is unquenched at a substantially higher frequency than the pulse repetition rate of the radar system in order to permit the derivation of an automatic regeneration control signal corresponding to the output of the superregenerator in the absence of received, object-reflected signals.

Such a radar system is described in the aforementioned copending Bradley application. The present invention provides range circuits which may be actuated in part by the same pulse signals which are used to unquench the superregenerator, but which are not affected by the occurrence of these unquenching pulses at a higher frequency than the P. R. F. rate of the radar system.

Figure 2:
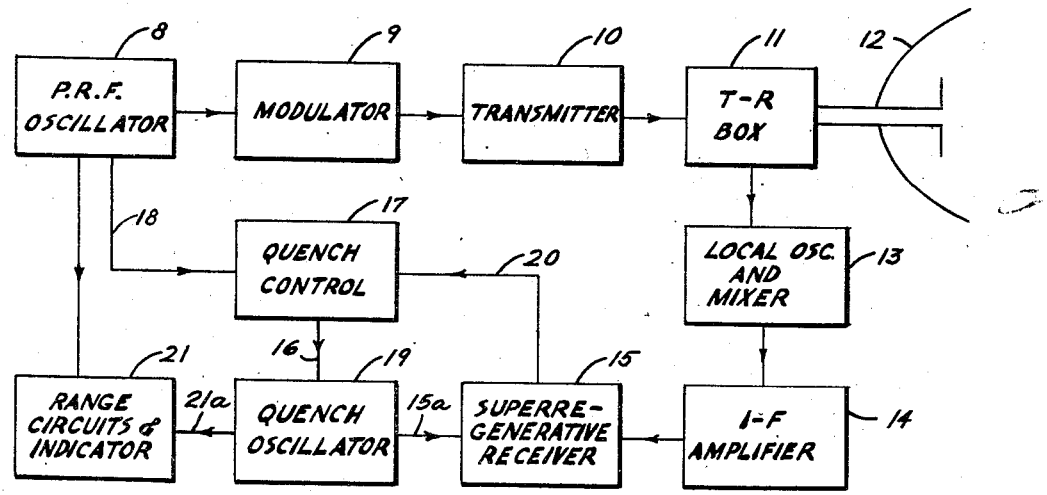
Figure 3:
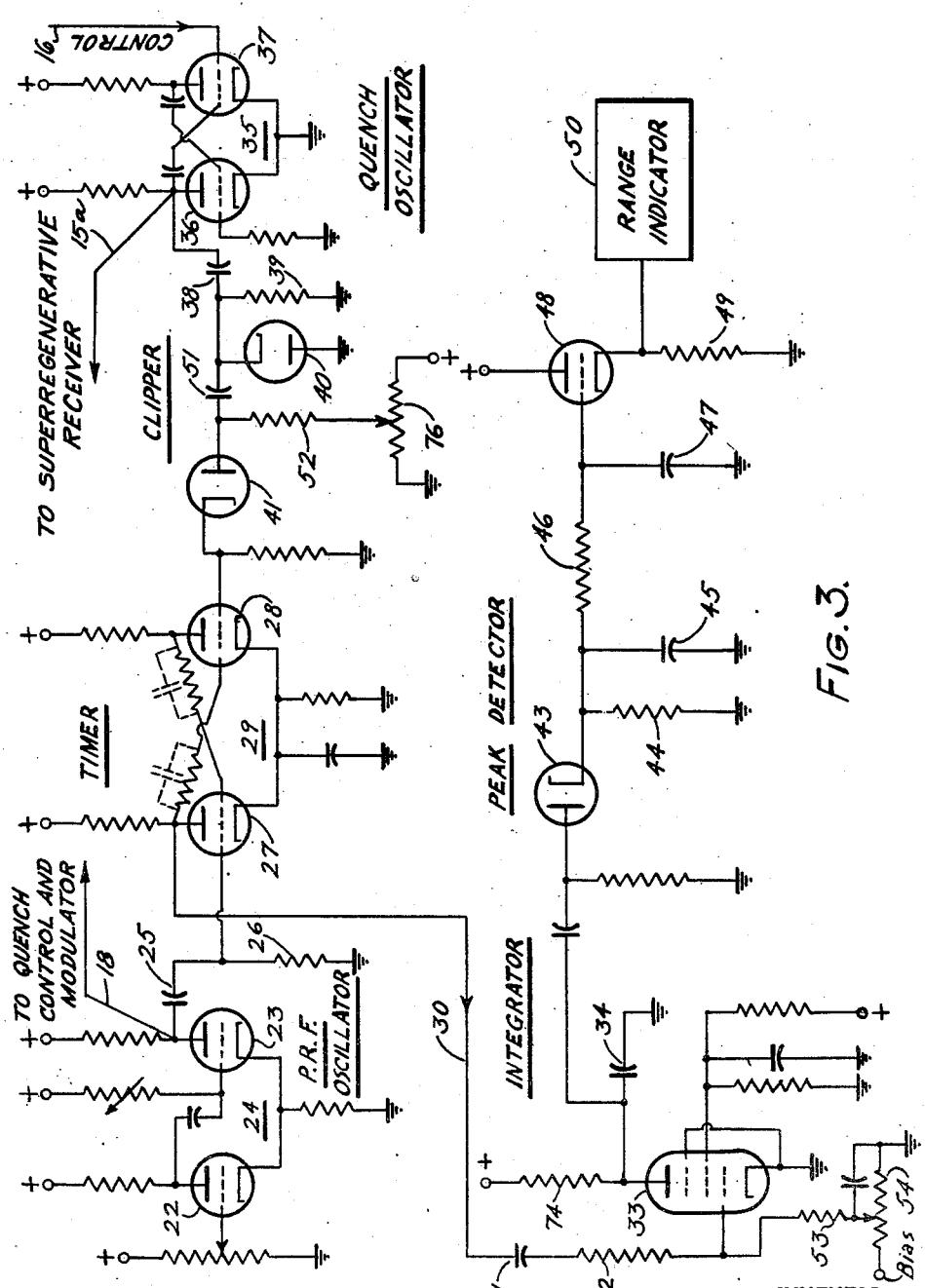
Figure 4:
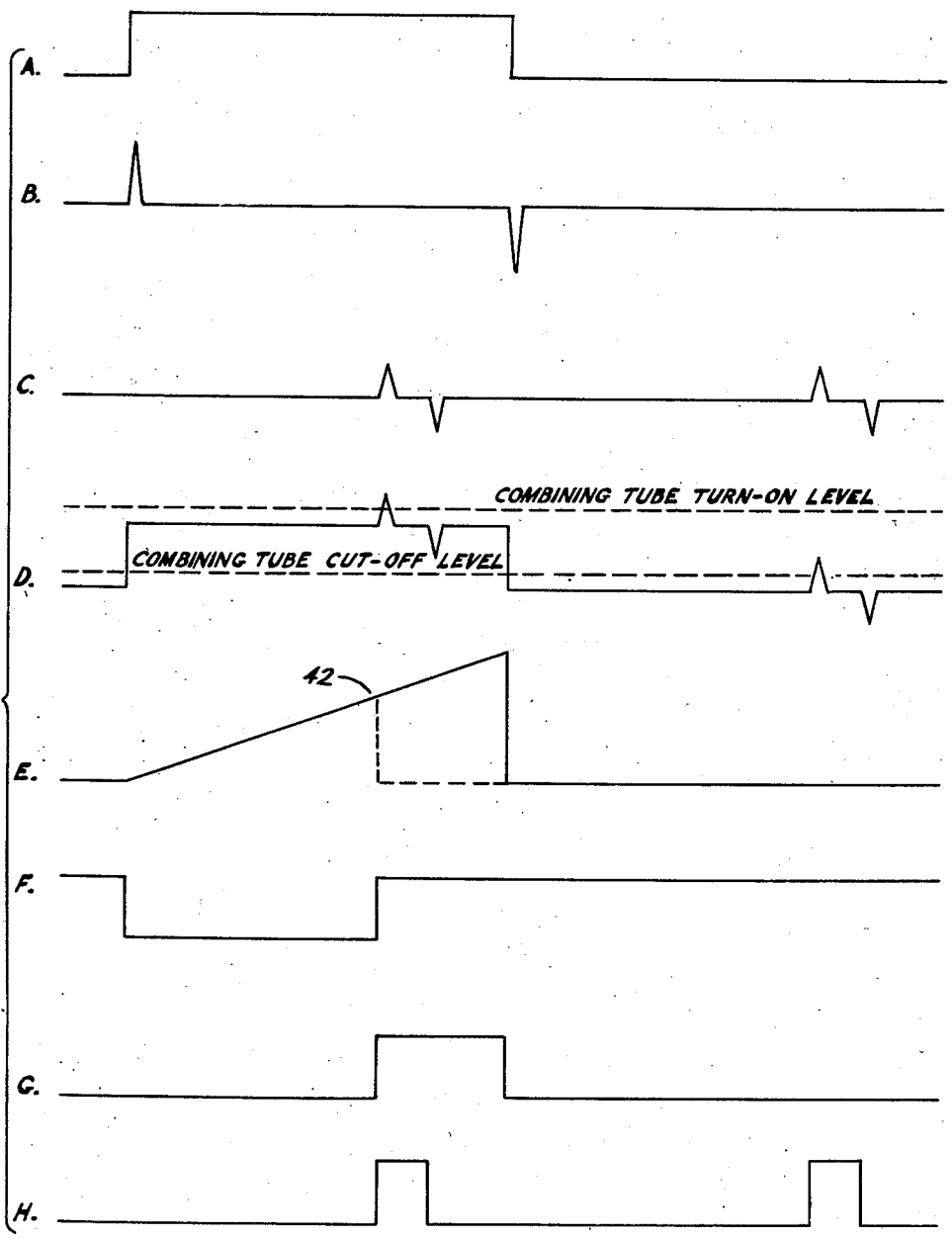
Figure 5:
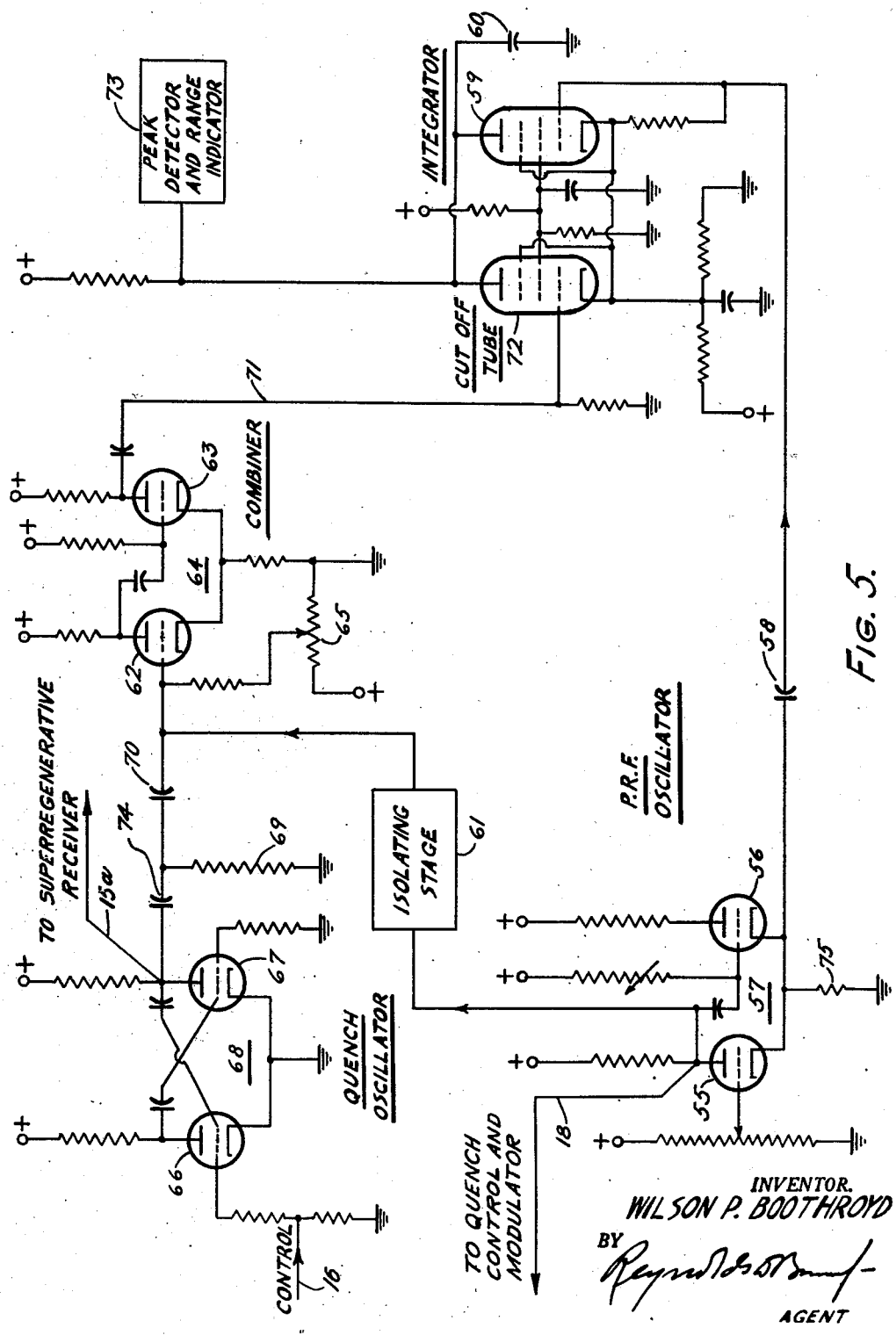
Figure 6:
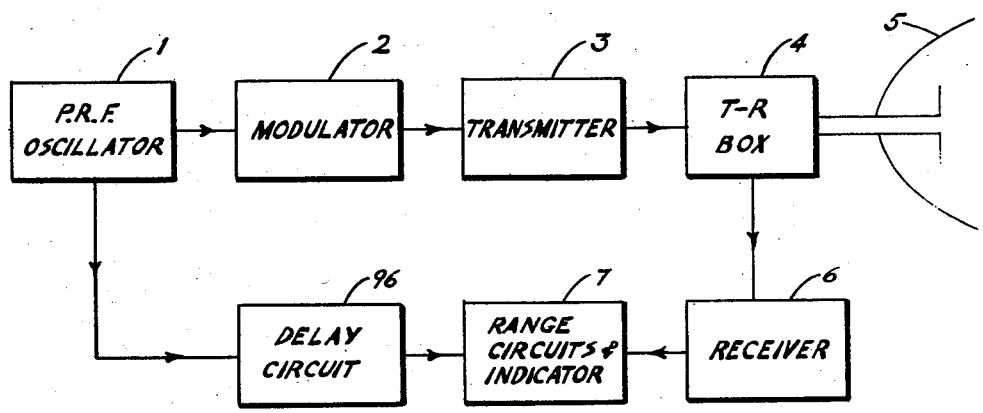

Other features and advantages of the invention will become apparent from a consideration of the following specification and of the drawings in which:

Figures 1 and 2 are block diagrams depicting two different radar systems of the general sort to which the present invention is applicable, Figures 3 and 5 are schematic diagrams illustrating different embodiments of the invention, Figure 4 illustrates various wave forms which will be referred to in describing the operation of the invention in its several embodiments, Figure 6 is a block diagram illustrating a modification applicable to the embodiments of Figures 3 and 5, Figure 7 is a schematic diagram of a circuit arrangement which may be substituted for certain portions of the circuit of Figure 3, and Figure 8 is an explanatory diagram illustrative of the potential waveform developed across resistor 89 in the embodiment of Figure 7.

Referring now to Figure 1, P. R. F. oscillator 1 may be any suitable generator of pulse signals of suitable duration for radar purposes and recurrent at a frequency of, for example, 2,000 cycles per second. These pulses are supplied to a modulator 2 for amplification and shaping, after which they are utilized to key transmitter 3 which generates bursts of high frequency energy, preferably in the microwave range and recurrent at the pulse repetition frequency. These bursts of high frequency energy are supplied through T-R box 4 to antenna 5 for transmission into space. Reflections of the transmitted pulses received by antenna 5 are supplied through T-R box 4 to receiver 6 which may be of any suitable form for receiving pulse signals. Pulses from P. R. F. oscillator 1 as well as pulses from receiver 6 are supplied to range circuits and indicator 7 which may be in accordance with the invention hereinafter to be described. In the arrangement as just described T-R box 4 may be of conventional form comprising a cavity resonator and associated spark gap adapted to permit free transmission of pulsed radio frequency energy from transmitter 3 to antenna 5, while at the same time minimizing the amount of such energy entering receiver 6, thereby to prevent interference with the operation of the receiver and possible destruction of certain of its components.

In Figure 2 the functions of P. R. F. oscillator 8, modulator 9, transmitter 10, T-R box 11 and antenna 12 may be substantially the same as those of their counterparts in the schematic of Figure 1. In the arrangement according to Figure 2, however, received, reflected, transmitted signals intercepted by antenna 12 are relayed through T-R box 11 to a local oscillator and mixer 13 for conversion to an intermediate frequency. The intermediate frequency signal is amplified in I.-F. amplifier 14 and supplied to superregenerative receiver 15. In response to pulses from quench oscillator 19, superregenerative receiver 15 is periodically unquenched, preferably, for the reasons aforementioned, at a frequency higher than that of P. R. F. oscillator 8. Furthermore, by means of quench control 17, these unquenching pulses may be delayed by varying amounts with reference to successive P. R. F. pulses. To effect such variations in the delay of the unquenching pulses, pulses from P. R. F. oscillator 8 are supplied through connection 18 to quench control 17, which may be adapted to produce, in response thereto, a control signal which varies periodically throughout a range sufficiently wide so that, when applied through connection 16 to quench oscillator 19 to control its frequency, the required variation in delay of unquenching pulses with reference to P. R. F. pulses will obtain. As a result of such variation, a condition will ultimately be reached when the superregenerative receiver will be unquenched simultaneously with the arrival of an object-reflected transmitted pulse. The output of superregenerative receiver 15, when this occurs, may be supplied through connection 20 to quench control 17 to cause it to decrease the range of variation of the quench control signal generated in response to P. R. F. pulses supplied through connection 18, and thereby to modify the delay of subsequent quench oscillator pulses with reference to corresponding P. R. F. pulses. In general terms the nature of this modification will be such as to cause the delay of unquenching pulses from quench oscillator 19 to vary throughout a very much smaller range in the neighborhood of the value corresponding to the actual range of the target. When the operation of quench oscillator 19 is thus modified upon the arrival of a reflected pulse simultaneously with the unquenching of superregenerative receiver 15, the unquenching pulses will continue to coincide substantially with subsequently received reflections from the same target and therefore may be supplied through connection 21a to range circuits and indicator 21, in the same manner and with the same effect that pulses from receiver 6 are supplied to range circuits and indicator 7 in the arrangement according to Figure 1. As in the latter arrangement, range circuits and indicator 21 may be in accordance with the invention as hereinafter described. As in the system shown in Figure 1, P. R. F. oscillator pulses are also supplied to the range circuits.

The schematic diagram of Figure 3 illustrates the details of circuits according to the invention suitable for use as the range circuits and indicator 21 of the arrangement according to Figure 2. Also shown in Figure 3, for convenience in discussing the operation of the circuits, are the details of P. R. F. oscillator 8 and quench oscillator 19 of the arrangement of Figure 2. Triodes 22 and 23 and associated connections may comprise a cathode feedback multivibrator 24 serving as the P. R. F. oscillator 8 in the arrangement of Figure 2. This oscillator may be adjusted to generate pulses at a pulse repetition rate of, for example, 2,000 cycles per second. Furthermore, oscillator 24 may be adjusted so that positive pulses at the P. R. F. rate and of duration corresponding to the time elapsing between the generation of such a pulse and the arrival at the receiver of its reflection from a target at maximum range will appear on the plate of tube 23. One such pulse is illustrated at A in Figure 4. These pulses are supplied through connection 18 to quench control 17 and modulator 9 of the arrangement of Figure 2 and are also differentiated as the result of the action of condenser 25 and resistor 26 to yield respectively short positive and negative pulses corresponding to their leading and trailing edges as represented at B in Figure 4. The pulses resulting from this differentiation, developed across resistor 26, are supplied to the grid of triode 27. Tubes 27 and 28 together with their associated connections comprise a timer circuit 29 which is adjusted to have two stable operating conditions. In one of these conditions, tube 27 will conduct while tube 28 is cut off; while in the other stable condition, tube 28 will conduct while tube 27 is cut off. The application to the grid of tube 27 of a positive pulse corresponding to the leading edge of a pulse from the P. R. F. oscillator will cause tube 27 to commence conducting, and the subsequent negative pulse corresponding to the trailing edge of the P. R. F. pulse will cause tube 27 to cease conducting. As a result there will appear on the plate of tube 27 a negative pulse of duration corresponding to that of the P. R. F. pulse (i. e. the inverse of the wave form shown at A in Figure 4). This negative pulse is supplied through connection 30, coupling condenser 31 and isolating resistor 32 to the control grid of a pentode integrator tube 33. Between the plate of pentode 33 and ground is connected a condenser 34. Tube 33 is adjusted so as normally to conduct, so that no appreciable potential will be developed across condenser 34. However, during the application to its grid of the negative pulse from the plate of timer tube 27, pentode 33 will be cut off and condenser 34 will be charged through resistor 74. The buildup of potential across condenser 34 will continue throughout the duration of the negative pulse applied to the grid of pentode 33, whereupon it will be terminated by the discharging of condenser 34 through tube 33. The wave form thereby generated across condenser 34 is represented by the solid line at E in Figure 4. This wave form, however, will be modified by the operation of other portions of the circuit as will now be explained.

Quench oscillator 19 of Figure 2 may, in the arrangement of Figure 3, comprise triodes 36 and 37 forming, together with their associated connections, a multivibrator oscillator 35. As already mentioned, the frequency of this oscillator may be substantially higher than the pulse repetition frequency, and the time relationships between quench oscillator pulses and P. R. F. pulses may be controlled in the manner hereinbefore described in connection with the discussion of Figure 2. This control is effected by quench control 17 of Figure 2 through connection 16 to the grid of quench oscillator tube 37 in Figure 3. Output from the quench oscillator is derived from the plate of tube 36 and is supplied through connection 15a to superregenerative receiver 15 of the arrangement of Figure 2. This output, which comprises pulses of the form represented at H in Figure 4, is also differentiated through the action of condenser 38 and resistor 39 to yield, respectively, positive pulses corresponding to their leading edges and negative pulses corresponding to their trailing edges as shown at C in Figure 4. By means of a clipper diode 40 connected between the ungrounded terminal of resistor 39 and ground, the negative pulses shown at C may be substantially eliminated, and only the positive pulses supplied through coupling condenser 51 and diode 41 to the grid of timer tube 28. Certain of these positive pulses will occur during the intervals in which tube 27 is conducting while tube 28 is cut off. Their effect will be to cause the timer circuit to assume its other stable condition—namely, that in which tube 28 is conducting while tube 27 is cut off. The result of this action will be to shorten the negative pulses appearing on the plate of tube 27 to durations corresponding to the actual target range. Thus, integrator tube 33 will be caused to commence conducting sooner than it otherwise would, and the potential across condenser 34 will build up only to the point 42 as represented at E in Figure 4. Thus, assuming the quench oscillator to be controlled so that certain pulses generated by it correspond in time to received, object-reflected pulses, it will be seen that the peak voltage developed across condenser 34 will be a function of target range. By means of a peak detector comprising diode 43, resistor 44 and condenser 45, a unidirectional potential which is a function of this peak voltage may be derived. After filtering by means of resistor 46 and condenser 47, this voltage may be supplied to the grid of a cathode follower output tube 48. The output from this tube derived across load resistor 49 may then be supplied to a suitable range indicator 50 (e. g., a voltmeter whose scale may, for convenience, be calibrated in units of range).

Diode 41, above referred to as being included in the connection between clipper diode 40 and timer tube 28, has its cathode connected to the grid of tube 28. It therefore acts to prolong the effect of positive pulses applied to the grid of tube 28 and thereby further limits the effect on the output of the timer circuit 29 of any residual negative pulses remaining as a result of incomplete functioning of clipper tube 40. Although it is desirable to take this additional precaution, diode 41 may be omitted without greatly affecting the operation of the system as a whole. When this is done, condenser 51 and resistors 39 and 52 may also be omitted, the cathode of diode 40 being connected directly to the grid of tube 28 and its anode being connected to the tap on potentiometer 76. Potentiometer 54 may then be adjusted so as to apply some positive bias to the grid of integrator tube 33, which will tend to remove the effects of residual negative pulses from the output of that tube.

It should be noted in particular with respect to the circuits just described that they will not be affected by the application, to the grid of tube 28, of positive pulses resulting from the differentiation of quench oscillator pulses occurring at a rate higher than that of the P. R. F. oscillator, inasmuch as tube 28 will be normally conducting at all times except during intervals corresponding to the occurrence of P. R. F. oscillator pulses.

The schematic diagram of Figure 5 illustrates another embodiment, according to the invention, of the range circuits and indicator 21 of the arrangement according to Figure 2. As in the case of Figure 3, the details of P. R. F. oscillator 8 and quench oscillator 19 of the arrangement of Figure 2 are shown for convenience in explanation. The embodiment of Figure 5 is adapted to yield substantially the same results as are obtainable using the circuits of Figure 3, but relying on a somewhat different mode of operation which will now be explained. As in the embodiment of Figure 3 a pulse repetition frequency oscillator 57 comprising triodes 55 and 56 and associated connections may be adjusted to oscillate at a frequency of, for example, 2,000 cycles per second and to generate pulses of duration equal to the time required for a radar signal to travel a distance equal to twice the desired maximum range of the system (e. g. 14 $\mu$ seconds=2,300 yards). Thus there might appear on the plate of tube 55, and also across cathode resistor 75, negative pulses which may be represented by the inverse of the wave form shown at A in Figure 4. Pulses from the plate of tube 55 are supplied through connection 18 to quench control 17 and modulator 9 of the arrangement of Figure 2. Pulses developed across resistor 75 are supplied through condenser 58 to the control grid of a pentode integrator tube 59, which, in cooperation with condenser 60, forms an integrator circuit substantially identical to the one shown in the previously described embodiment. The negative pulses from P. R. F. oscillator 57, applied to the grid of pentode 59, will cause it to cut off during successive intervals at the P. R. F. rate and will cause to appear, across condenser 60, pulses corresponding to the solid-line representation at E in Figure 4.

The negative pulses developed on the plate of tube 55 are supplied through isolating stage 61 to the grid of tube 62. Isolating stage 61 should be adapted to invert them to produce positive pulses corresponding to the one shown at A in Figure 4. Triodes 62 and 63 together with associated connections form a combiner circuit 64, the mode of operation of which is substantially identical to that of timer circuit 29 of Figure 3 described in connection with the embodiment of that figure. However it is actuated in a different way and performs a different function from that of the timer circuit, as will now be set forth. Assuming tube 62 to be cut off at the time a positive pulse from isolating stage 61 is applied to its grid, the bias applied to the grid of tube 62 from potentiometer 65 should be such as to prevent the tube from conducting owing solely to the application of such positive pulses.

Quench oscillator 68 comprising triodes 66 and 67, as in the case of the previously described embodiment of the invention, is adapted to generate unquenching pulses at a rate which may be higher than that of the P. R. F. oscillator. Positive pulses corresponding to those represented at H in Figure 4 are derived from the plate of tube 67 and are supplied through connection 15a to superregenerative receiver 15 of the arrangement according to Figure 2. These pulses are also differentiated through the action of condenser 74 and resistor 69 to produce positive and negative pulses corresponding respectively to leading and trailing edges, as represented at C in Figure 4. These pulses are applied through coupling condenser 70 to the grid of triode 62. Whenever a positive pulse corresponding to the leading edge of an unquenching pulse appears on the grid of tube 62 simultaneously with a positive pulse from isolating stage 61, they will effectively combine to yield a signal of the form shown at D in Figure 4. With proper adjustment of biasing potentiometer 65, the occurrence of the narrow positive pulse superimposed upon a pedestal provided by the positive pulse from isolating stage 61 will cause tube 62 to commence conducting. Such conduction will continue until the end of the positive pulse from isolating stage 61. By proper adjustment of combiner circuit 64, in a manner which will be apparent to those skilled in the art, the value of positive potential required to be applied to the grid of tube 62 to cause it to conduct can be made greater than the level below which the grid potential must fall to cut off the tube. Thus, by properly adjusting the relative magnitudes of pulses supplied from isolating stage 61 and those developed on the plate of tube 67, as represented at D in Figure 4, combiner circuit 64 may be made to ignore the negative pulses resulting from differentiation of the trailing edges of the quench oscillator pulses, and to assume its alternate stable condition with tube 62 cut off only upon the termination of the pedestal pulse from isolating stage 61.

As a result of this action there will appear on the plate of tube 63 a pulse of the form shown at G in Figure 4, the duration of which is equal to the time from the occurrence of the leading edge of the unquenching pulse, which occurs during the occurrence of a P. R. F. oscillator pulse, to the end of the P. R. F. oscillator pulse. This pulse from the plate of tube 63 is applied through connection 71 to the grid of pentode cut-off tube 72, the plate and cathode of which are connected to the corresponding elements of integrator tube 59. Such pulses will cause tube 72 to conduct and discharge condenser 60 immediately upon the occurrence of the unquenching pulse. Furthermore, since tube 72 will continue to conduct until the end of the current P. R. F. oscillator pulse, condenser 60 will be prevented from regaining its charge despite the fact that tube 59 will be cut off until the termination of the same P. R. F. oscillator pulse supplied to its grid. The net result will be to modify the form of pulses generated across condenser 60 in accordance with the broken line representation at E in Figure 4. As in the case of the previously described embodiment, quench oscillator 68 is controlled so that, in the presence of a target, certain of the pulses generated by it will correspond substantially to received target-reflected pulses. This control is effected by quench control 17 of Figure 2 through connection 16 to the grid of quench oscillator tube 66 in Figure 5. Thus the peak amplitude of the wave form appearing across condenser 60 will be a function of target range, and an output signal corresponding to this peak amplitude may be derived by means of peak detector and range indicator 73 which may comprise substantially the same circuits as those shown in the embodiment of Figure 3.

It is to be noted that only those quench oscillator pulses which occur simultaneously with pulses from the P. R. F. oscillator will be effective to cause tube 62 to conduct, and thus, regardless of the fact that the quench oscillator frequency may be higher than the pulse repetition frequency, the operation of the range circuit will not be adversely affected. Further it is to be noted that, in the embodiment here shown, there is no need to limit the negative pulses resulting from differentiation of quench oscillator pulses since they will not normally affect the operation of combiner tube 62.

Although, in both of the embodiments described, quench oscillator pulses, corresponding in time to received, reflected transmitted pulses, are used to actuate the range circuits, it is to be understood that the received pulses themselves might just as well have been used. This alternative is clearly shown in the block diagram of Figure 1.

It is apparent from the foregoing descriptions that both of the arrangements can be adjusted so as to respond only to targets at less than a predetermined maximum range, whereby confusion can be greatly reduced by selecting only that range which it is desired to observe. In the two embodiments the maximum range is determined by the duration of pulses generated by P. R. F. oscillators 24 and 57 respectively.

Another feature of the invention is that the minimum range of target to which the system will respond can be fixed, in either embodiment, merely by delaying, with respect to transmitted pulses, the leading edges of pulses supplied by the P. R. F. oscillators to the range circuits. In the embodiment of Figure 3, this will delay the conduction of timer tube 27, while in the embodiment of Figure 5 it will make it impossible for combiner tube 62 to conduct prior to a certain time after the transmission of a pulse, even though a return signal may be received prior to such time. In both instances no indication of range will result for a received, reflected transmitted signal from a target at less than a predetermined minimum range. The means for doing this may comprise a delay circuit 96 introduced between the P. R. F. oscillator and the range circuits as shown in the block diagram of Figure 6, which is otherwise the same as Figure 1 as indicated by using the same reference characters for like parts. It is obvious that a similar modification could be applied to the arrangement of Figure 2.

In the schematic of Figure 7 is shown an alternative arrangement which may be substituted for the integrator, peak detector and cathode follower output tube circuits of the embodiment of the invention shown in Figure 3, to derive, from the pulses of varying duration appearing on the plate of timer 27 of the embodiment of Figure 3, a unidirectional potential, the magnitude of which is a function of range. This substitution is made simply by breaking connection 30 in Figure 3 at a point between the plate of tube 27 and condenser 31 and connecting the plate of tube 27 through connection 30 to the anodes of diodes 81 and 82 in the circuit of Figure 7. This arrangement comprises a triode 77 connected to a tank circuit comprising condenser 78 and inductor 79 to form an oscillator operating at a frequency of, for example, 5 megacycles per second. It will be noted that a portion of inductor 79 is included in both anode and grid circuits of tube 77 in order to provide the necessary coupling between the circuits required for oscillation. Coupled to tank circuit inductor 79 by means of inductor 80 is a damping circuit comprising serially connected opposed diodes 81 and 82. By applying a suitable bias to diodes 81 and 82 through a connection to a center tap on inductor 80 they may be caused normally to conduct and damp the oscillator tank circuit so as to inhibit oscillations therein. However, negative pulses applied through connection 30 to the plates of both diodes from the plate of timer tube 27 (Figure 3) will cause the diodes to cease conducting, remove the damping from the oscillator tank circuit and permit oscillations to build up therein. This damping circuit is described and claimed in copending application of William E. Bradley, Serial No. 660,037, filed April 6, 1946. The time during which oscillations will build up and continue in the tank circuit is determined by the duration of pulses applied through connection 30. Differences in the duration of such pulses may be detected by a counter circuit comprising diodes 86 and 87 oppositely connected in shunt with each other from a common plate of condenser 88 to ground. The other plate of condenser 88 may be connected to a tap on tank circuit inductor 79. This counter circuit, which is described and claimed in copending application of Joseph C. Tellier, Serial No. 658,894, filed April 2, 1946, is adapted to count the individual positive cycles of the signal generated in the tank circuit of the oscillator and to provide, across load impedance 89 in the cathode circuit of diode 87, an integrated unidirectional potential proportional to the duration of pulses supplied to the circuit through connection 30. Thus for a pulse of duration $t_1$ as represented at 84 the potential across resistor 89 may build up during this interval to a certain value as indicated in Figure 8; while, for a pulse of longer duration $t_2$ it will build up to a higher value. This unidirectional potential may be filtered by the action of resistor 90 and condenser 91 and supplied to the grid of a cathode follower output tube 92. From a load resistor 93 in the cathode circuit of tube 92, a unidirectional potential proportional to range may be derived for supply to any suitable form of range indicator 94 (e. g., a voltmeter whose scale may, for convenience, be calibrated in units of range). In the arrangement shown, condenser 88 may have a relatively small capacitance of the order of $15\mu\mu$ farads as compared to that of condenser 95, which may be of the order of $100\mu\mu$ farads.

I claim:

A system for indicating the time-spacing between pulse signals, said system comprising: a controllably activatable integrator circuit operative to develop a peak output which varies as a function of the durations of the intervals of activation of said circuit, said circuit comprising a capacitor, means for charging said capacitor and first and second vacuum tubes, each having at least triode elements and each having its anode-cathode path connected effectively in shunt with said capacitor, means normally biasing said first tube to render said tube conductive to short-circuit said capacitor, a source of periodically recurrent time-spaced pulses of predetermined durations, a connection for applying said last-named pulses to the grid of said first tube in appropriate polarity and magnitude to overcome said bias and to render said tube non-conductive during the occurrence of said pulses, a non-oscillatory multivibrator circuit comprising a pair of vacuum tubes, each having at least triode elements, and connections between the elements of said last-named tubes for causing one of said tubes to be rendered conductive whenever the other of said tubes is rendered non-conductive, whereby to form a circuit characterized in having first and second normally stable conditions depending on which of said tubes is conducting, said conditions being characterized respectively by substantially differing first and second output signal levels, means normally biasing at least one of said last-named tubes to cause said circuit to assume its first normally stable condition, a connection for applying the output from said multivibrator circuit to the grid of the second of said tubes comprising said integrator circuit in such polarity and magnitude that second tube is rendered non-conductive when said multivibrator is in its first normally stable condition and is rendered conductive to short-circuit said capacitor when said multivibrator is in its second normally stable condition, a source of pulses of relatively shorter duration than pulses from said first-named source and which occur during the occurrence of said pulses from said first source, connections for applying pulses from both of said sources to the grid of one of said multivibrator tubes in like polarity and in such magnitude that pulses from said first source alone are ineffectual to produce a shift of said multivibrator from its first normally stable condition to its second normally stable condition, but such that pulses from both of said sources occurring simultaneously are effectual to produce such a shift, and means for deriving from said integrator a signal which is a function of its peak output and which is therefore indicative of the time-spacing between the leading edges of pulses from said first source and pulses from said second source.

WILSON P. BOOTHROYD.

REFERENCES CITED

The following references are of record in the file of this patent:

UNITED STATES PATENTS

| Number | Name | Date |
| --- | --- | --- |
| 2,359,080 | Bivens | Sept. 26, 1944 |
| 2,402,916 | Schroeder | June 25, 1946 |
| 2,404,527 | Potapenko | July 23, 1946 |
| 2,417,136 | Smith | Mar. 11, 1947 |
| 2,418,364 | Moe | Apr. 1, 1947 |
| 2,419,541 | De Rosa | Apr. 29, 1947 |
| 2,421,018 | De Rosa | May 27, 1947 |
| 2,421,020 | Earp | May 27, 1947 |
| 2,422,382 | Winchel | June 17, 1947 |

OTHER REFERENCES

Publication "Radar, Electronic Fundamentals," Navy Dept., June 1944. NAVSHIPS 900,016, pages 194, 195, 196, 202 and 203.